No. 842,867. PATENTED FEB. 5, 1907.
F. A. DECKER.
BATTERY.
APPLICATION FILED JULY 14, 1906.

WITNESSES:
Jos. G. Kenny Jr.
Rob't R. Kitchel

INVENTOR
Frank A. Decker
BY
Charles N. Butler
ATTORNEY.

UNITED STATES PATENT OFFICE.

FRANK A. DECKER, OF PHILADELPHIA, PENNSYLVANIA, ASSIGNOR TO DECKER ELECTRICAL MANUFACTURING COMPANY, OF WILMINGTON, DELAWARE, A CORPORATION OF DELAWARE.

BATTERY.

No. 842,867.     Specification of Letters Patent.     Patented Feb. 5, 1907.

Application filed July 14, 1906. Serial No. 326,233.

*To all whom it may concern:*

Be it known that I, FRANK A. DECKER, a citizen of the United States, and a resident of Philadelphia, in the county of Philadelphia and State of Pennsylvania, have invented certain Improvements in Batteries, of which the following is a specification.

This invention is a battery in which there is provided an auxiliary bottom disposed within an envelop and connected, through the bottom of such envelop, with an exterior member, by means of which a conduit or conduits without the envelop is connected to and communicates with a conduit or conduits within the envelop. The envelops are preferably of lead, separated by insulating material, while the auxiliary bottom and the exterior member are preferably of hard rubber, vulcanized together through holes in the bottom of the envelop, so that a firm, tight, and insulating construction is produced.

These features and the further improvements of the invention will fully appear in the following description and the accompanying drawings in illustration thereof.

Figure 1:
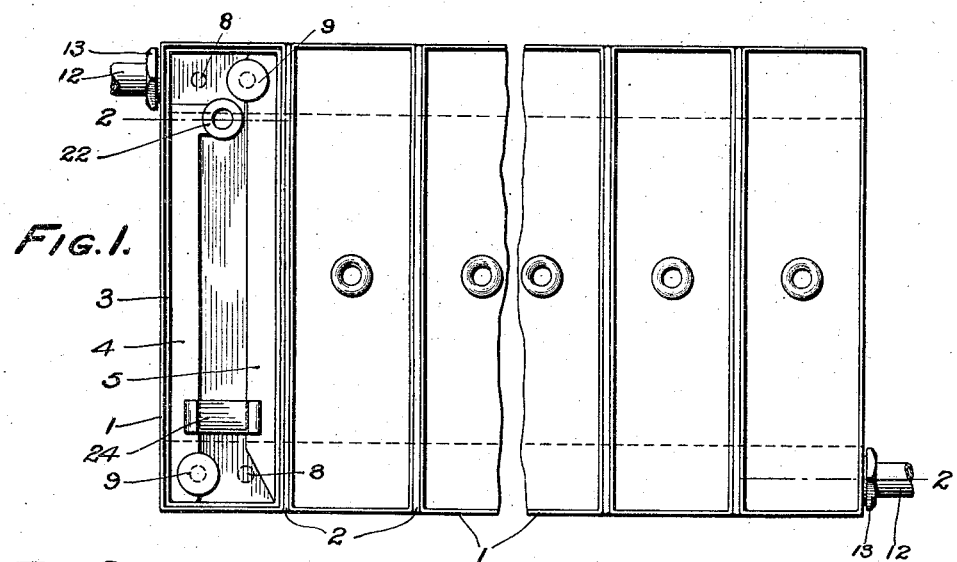
Figure 2:
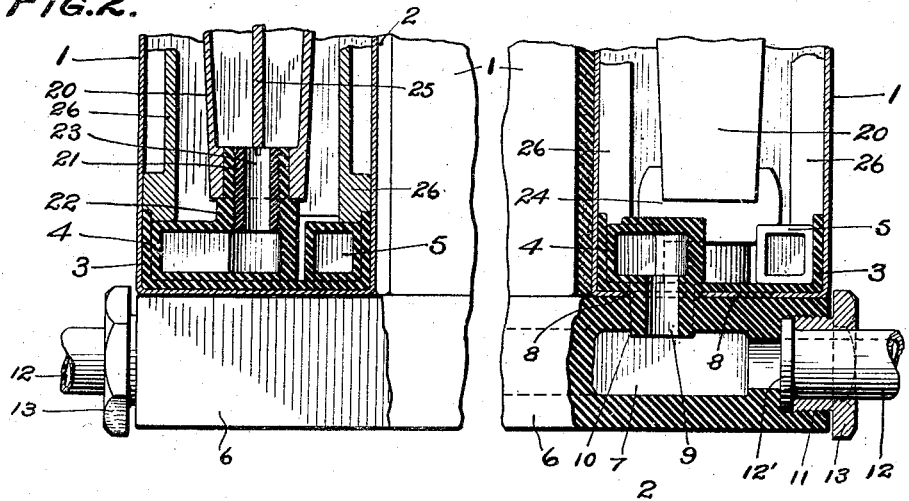

In the accompanying drawings, Figure 1 represents a plan view of a broken battery embodying the improvements. Fig. 2 represents a sectional side elevation of the same, taken on the line 2 2 of Fig. 1; and Fig. 3 represents a sectional elevation illustrating a second form of the invention.

Referring to the drawings, the envelops 1, suitably made of lead, are separated to prevent short-circuiting by insulating material 2, disposed between their adjacent walls. Within the envelops are the auxiliary insulating-bottoms 3, preferably of hard rubber in the form of pans, and supported on the auxiliary bottoms are the insulating-tubes 4 and 5, preferably of hard rubber vulcanized to the auxiliary bottoms.

As shown in Figs. 1 and 2, the envelops 1 are supported upon the insulating members 6 (preferably of hard rubber) with passages 7 therein. The bottoms of the envelops are provided with apertures 8, through which the members 3 and 6 are fixed together, as by vulcanization, and the passages of the tubes 4 and 5 are connected to the passages of the conduits 6 by nipples 9 on the tubes and passing through the auxiliary bottoms and the bottoms of the envelops into sockets 10 of the conduits 6, to which they are vulcanized. Threaded sockets 11 in the conduits 6 receive the ends of pipes or conduits 12, having flanges 12' thereon, and nuts 13, sleeved on the pipes, are screwed into the sockets to engage the flanges and form a tight joint between the communicating conduits 6 and 12.

Figure 3:
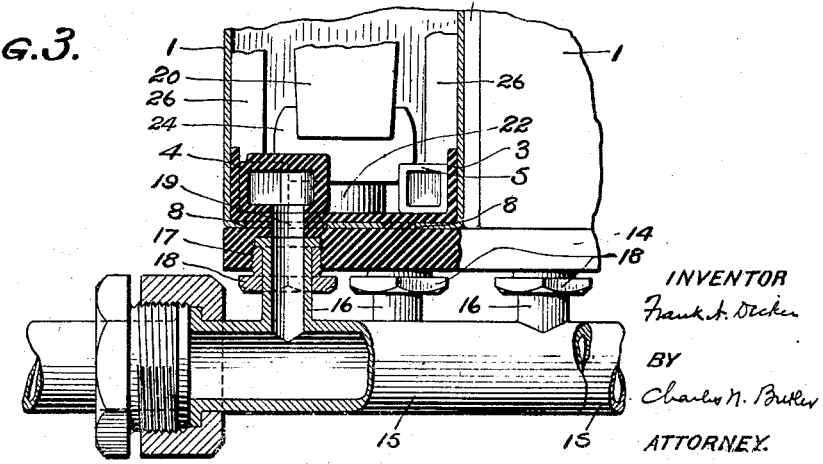

As shown in Fig. 3, the envelops 1 are supported on the rubber insulating exterior members 14, vulcanized, through the envelop-openings 8, to the auxiliary bottoms 3. Conduits 15 are provided with flanged branches 16, which fit in threaded sockets 17, formed in the parts 14, and nuts 18, sleeved on the branches, engage the flanges in the sockets. Communication is established between the branches and the interior conduits by passages 19, whose walls are formed by the vulcanization together of the interior conduits, the auxiliary bottom, and the exterior member.

Porous cups 20 within the envelops have the threaded rubber bushings 21 in the bottoms thereof in registration with threaded bosses 22 of the conduits 4, and a tubular coupling 23 is screwed into the parts 21 and 22 to connect the cups to the conduits. The cups supported thus and by the bridges 24 contain the positive electrodes 25 and the solution therefor, conducted thereto and therefrom by the passages described. The spaces exterior to the cups contain the negative electrodes 26 and the solution therefor, carried to and from such spaces by the passages described.

Having described my invention, I claim—

1. A battery construction comprising a metal envelop having an auxiliary bottom of non-conducting material, a tube within said envelop, and a conduit exterior to and connected through said bottom with said tube.

2. A battery construction comprising an envelop having a metal bottom, an insulating auxiliary bottom within said envelop, and an insulating member exterior to the bottom of said envelop, said auxiliary bottom and exterior member being directly connected together through an opening in said metal bottom.

3. A battery construction comprising a metal envelop, an auxiliary rubber member within said envelop, and a rubber member exterior to said envelop, said rubber members being vulcanized together through an opening is said envelop.

4. A battery construction comprising a metal envelop, an auxiliary bottom member of insulating material in the form of a pan within said envelop, and an exterior member of insulating material secured to said bottom member through an opening in said envelop.

5. A battery construction comprising a plurality of metal envelops, non-conducting material separating said envelops, exterior to the bottoms of said envelops a non-conducting member having a passage or passages therein, and within each envelop a non-conducting member with a passage therein registering with a passage of said exterior member through an opening in the bottom of the corresponding envelop.

6. A battery construction comprising a plurality of metal envelops, non-conducting material separating said envelops, exterior to the bottoms of said envelops a non-conducting member or members with passages therein, and a non-conducting conduit or conduits within each of said envelops, each of said conduits having a non-conducting connection with an exterior non-conducting member.

7. A battery construction comprising a metal envelop, a rubber bottom member within said envelop, a rubber member with a passage therein exterior to said envelop and vulcanized through an opening therein to said bottom member, and a rubber conduit supported within said envelop by said bottom member and communicating with the passage of said exterior member.

8. A battery construction comprising a plurality of lead envelops insulated from each other, a rubber pan within each envelop, a plurality of rubber conduits within each envelop and communicating respectively with corresponding compartments thereof, and exterior to said envelops a plurality of rubber members with passages therein communicating with said conduits and vulcanized to said pans through openings in said envelops.

In testimony whereof I have hereunto set my name, this 11th day of July, 1906, in the presence of the subscribing witnesses.

FRANK A. DECKER.

Witnesses:
 CARLYLE H. ROSS,
 JOS. G. DENNY, Jr.